June 11, 1963 N. OSIFCHIN ETAL 3,093,805

COAXIAL TRANSMISSION LINE

Filed July 26, 1957

INVENTORS N. OSIFCHIN
A. L. ZITCER

BY Patrick J Roche

ATTORNEY 3,093,805

COAXIAL TRANSMISSION LINE

Nicholas Osifchin, Clifton, and Abel L. Zitcer, Mountain Lakes, N.J., assignors, by mesne assignments, to the United States of America as represented by the Secretary of the Army Filed July 26, 1957, Ser. No. 674,539
1 Claim. (Cl. 333—84)

This invention relates to high-frequency transmission systems, and more specifically to a coaxial conductor transmission line of the printed type for use in such systems.

In United States Patent No. 2,721,312, issued October 18, 1955, to D. D. Grieg and H. F. Engelmann, there is disclosed a line-above-ground transmission line which involves a printed circuit wiring technique and which comprises a pair of flat conductors spaced in substantially parallel relation by a flat dielectric board having substantially parallel surfaces. The so-called ground conductor is deposited by any of the recognized printed wiring techniques on one surface of the dielectric board while the line conductor of considerably narrower width is deposited by similar techniques on the opposite surface of the dielectric board. Depending on the particular thickness of the dielectric board chosen to hold the line and ground conductors in spaced relation, a suitable frequency band of electromagnetic wave energy can be propagated along the transmission line.

In the above-noted patent it is recognized that, where flat conductors are employed, the electric field cannot be entirely confined within the bounds defined by the line and ground conductors. This construction of the conductors tends to occasion some transmission loss due to radiation. As one concept for minimizing such loss, the patentees folded the ground conductor in right-angle relation to the main portion thereof to form a trough foı the line conductor. Although this construction tended to confine the electric field to the dielectric layer between line and ground conductors thereby enabling some reduction in radiation losses, it tends to present the following problems: (1) printing the right-angle side edges of the ground conductor on one surface of the dielectric board, (2) printing two or more transmission lines in parallel on the same dielectric board, and (3) printing a transmission line which is curved to round corners on a circuit board.

It is a principal object of the present invention to provide a facile technique for printing a high-frequency transmission line.

It is another object to print a plurality of high frequency transmission lines on the same dielectric board.

It is a further object to form an effective shielding trough for a printed circuit transmission line by well known printing techniques.

A feature of the invention involves the printing of a plurality of transmission lines side-by-side on the same dielectric board while at the same time obviating spurious coupling between adjacent transmission lines. Another feature concerns the printing of the respective line conductors on the same surface of the dielectric board. A further feature relates to the use of a single ground plane for a plurality of high frequency transmission lines printed on the same dielectric board. A still further feature relates to the printing of one or more transmission lines which are not necessarily straight along the longitudinal axis.

The above-mentioned objects and features will be made more apparent from the following description when taken together with the accompanying drawings, in which.

Figure 1:
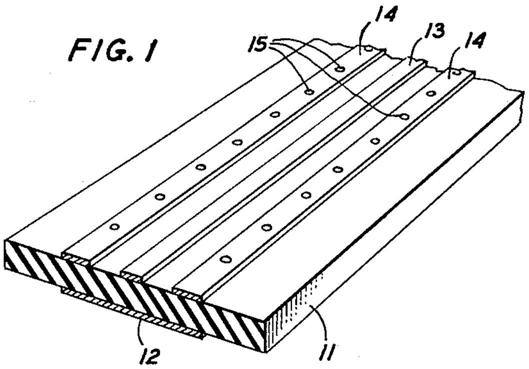
FIG. 1 is a perspective view of a printed transmission line in accordance with a specific embodiment of the present invention.
Figure 3:
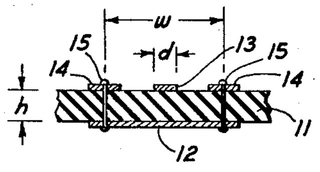
FIGS. 2 and 3 are plan and end views, respectively, of FIG. 1.
Figure 2:
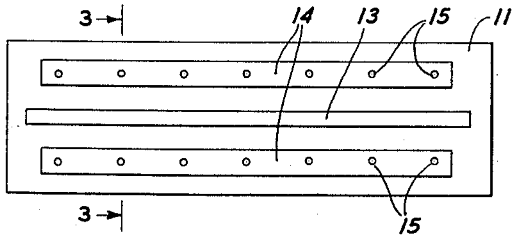

As shown in FIGS. 1, 2 and 3, a printed circuit transmission line in accordance with the invention comprises a solid dielectric 11, a wide flat strip 12 of rectangular cross-section and conductive material forming a ground conductor mounted on one surface of the dielectric; a narrow flat strip 13 of rectangular cross-section and conductive material forming a line conductor and mounted on an opposite surface of the dielectric with center lines of strips 12 and 13 in substantial coincidence in one plane, and two further narrow flat strips 14, 14 of conductive material and rectangular cross-section forming electric shielding conductors and mounted on opposite sides of line conductor 13 on the other surface of the dielectric. Each strip 14 has an inner edge disposed parallel to, but spaced from, an adjacent edge of line conductor 13. Also each strip 14 has an outer edge lying in the same plane with an outer edge of the ground conductor 12.

Electrical interconnection is made between shielding conductors 14, 14 and ground conductor 12 by any convenient means, such for example, as drilling small holes through the dielectric board from shield conductors 14, 14 to ground conductor 12 at suitable intervals, inserting conductive wires through these holes, and applying solder to the ends of the wires at the ground and shielding conductors 14, 14 as indicated by dots 15 on strips 14 shown in FIGS. 1, 2 and 3. An alternative arrangement for electrically interconnecting the shielding and ground conductors may comprise hollow rivets or eyelets with their ends staked over (not shown).

Printed circuit wiring boards built heretofore with known techniques are so planned that one side of the dielectric board is reserved for mounting apparatus such as resistors, capacitors, inductors, diodes, transistors, and the like, while the opposite side of the dielectric board is for the most part reserved for the interconnecting printed wiring. The shielded transmission line in accordance with this invention constitutes effectively a shielded coaxial cable which is readily adapted to such known printed circuit techniques. The ground conductor is conveniently printed on the apparatus mounting side of the dielectric board, whereas the center conductor and the shielding conductors are deposited on the interconnection wiring side of the dielectric board.

The dielectric board may be composed of any suitable laminating material such as polystyrene, phenolic resin, "Teflon," or glass-fiber reinforced epoxy resins. The thickness of the board, of course, determines the spacing between the ground and line conductors and hence the characteristic impedance of the transmission line. Also, the dielectric constant of the board material is important.

The conductive material is preferably copper which may be laminated to the printed circuit board by any of the well known laminating processes and then etched to remove the undesired portions. In an alternative structure, the conductive material may be die-stamped on the printed wiring board.

Figure 6:
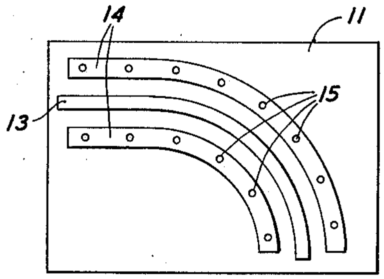
FIG. 6 is a plan view of a curved printed transmission line in accordance with a modification of the invention shown in FIG. 1.

Although FIGS. 1, 2 and 3 illustrate a longitudinally rectilinear transmission line, it is apparent that all or a part of such transmission line may be curvilinear, i.e., the line may be constructed on a curve as shown in FIG. 6 in accordance with a modification of the invention shown in FIGS. 1, 2 and 3. In FIG. 6 it will be understood that ground conductor 12, not shown, has a curvature identical with that of conductors 13 and 14, center lines of conductors 12 and 13 lie in coincidence in one plane, and the outer edges of conductors 14 and the ground conductor lie in the same cylindrical surface. Reference characters corresponding to those of FIGS. 1, 2 and 3 are shown in FIG. 6.

Figure 4:
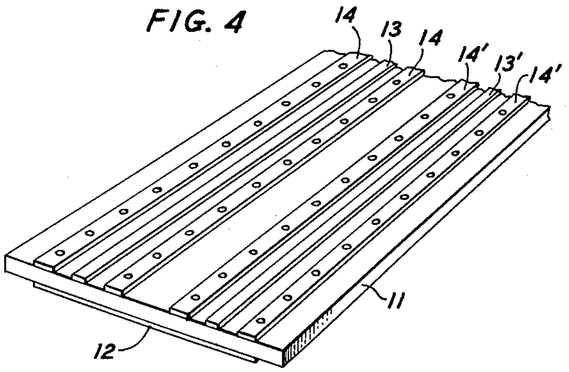
FIG. 4 is a perspective view of two printed transmission lines on a single dielectric in accordance with a modification of the invention shown in FIG. 1.

FIG. 4 shows two independently shielded coaxial transmission lines affixed to a printed wiring board in a geometrically parallel relationship using a common ground conductor without any appreciable amount of electric coupling between the discrete coaxial conductors in accordance with a further modification of the invention shown in FIGS. 1, 2 and 3. In FIG. 4, the first coaxial conductor line comprises conductors 12, 13 and 14 as in FIGS. 1, 2 and 3, while the additional coaxial conductor line comprises ground conductor 12, center conductor 13′ and shielding conductors 14′, 14′. As mentioned above in regard to the shielded coaxial conductor line shown in FIGS. 1, 2 and 3, it will be understood that in the two shielded coaxial conductors shown in FIG. 4, the outer edges of the outer shielding conductors 14 and 14′ lie in the same plane with the outer edges of the ground conductor 12.

It will be apparent that additional coaxial conductor lines may be affixed to the printed wiring board shown in FIG. 4 by extending the width of ground conductor 12 as necessary and adding center and shielding conductors with appropriate interconnections from the shielding conductors to the ground strip in the manner shown in FIG. 3. Also, it is obvious that either one or both lines may include, if desired, a curvilinear portion as shown in FIG. 6.

Figure 7:
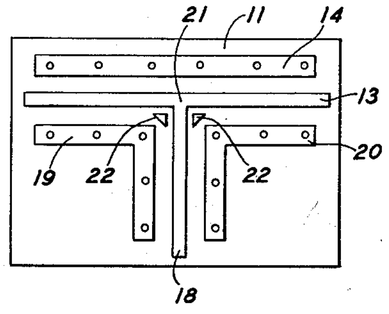
FIG. 7 is a plan view of a branched printed transmission line in accordance with a modification of the invention shown in FIG. 1.

A further modification of a shielded printed transmission line in accordance with the invention shown in FIGS. 1, 2 and 3 is illustrated in FIG. 7. In FIG. 7 a branch line conductor 18 joins with the main line conductor 13 at branch connection 21 on the one surface of the dielectric board. Shield conductor 14 adjacent to the one side of main line 13 is the same as one of the correspondingly numbered shield strips in FIGS. 1, 2 and 3. Shield conductors 19 and 20, replacing one shield conductor 14 in FIGS. 1, 2 and 3, however, are disposed in parallel with the main line conductor 13 up to branch connection 21, and are thereafter arranged in parallel with branch line conductor 18. The ground conductor on the opposite surface of the dielectric board, not shown, is extended to underlie the branch line conductor 18 and the additional shield conductors 19 and 20 and therefore comprises substantially a T-configuration. Conductive connections between the ground conductor and the additional shield conductors are appropriately made as described in connection with FIGS. 1, 2 and 3.

At the branch connection an impedance mismatch tending to occur between conductors 13 and 18 is compensated for by one or the other of several known expedients. For example, matching elements 22 as shown on FIG. 7 may be employed. These matching elements are small additional deposits of conductive material near the junction of the main and branch line conductors of such size and shape as effectively to change the impedance at the junction to provide a suitable impedance match therebetween. The appropriate size and shape for the matching elements is determined empirically. In the alternative an additional shielding member above the junction may be built up over the line conductors. The first suggested matching arrangement most readily adapts itself to printing techniques.

It is to be understood that the branch and line conductors need not be constructed normal to each other as shown in FIG. 7, but that acute and/or obtuse branching angles may be readily laid out and printed in accordance with this invention.

Figure 5:
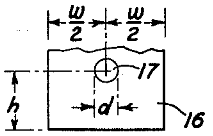
FIG. 5 is a theoretical diagram to aid in explaining the invention.

It may be mathematically demonstrated that the shielded coaxial transmission line shown in FIGS. 1, 2 and 3 is substantially equivalent in electrical characteristics to a cylindrical coaxial transmission line comprising an inner conductor positioned in a trough type outer conductor illustrated schematically in FIG. 5. In the latter figure reference characters 16 and 17 indicate the outer trough and inner conductor, respectively, the trough 16 comprising a conductive strip formed with a horizontal bottom and integral vertical sides and the inner conductor 17 being circular in cross-section.

The characteristic impedance of the wire-in-a-trough transmission line can be calculated from the following equation taken from Fig. S on page 327 of "Reference Data for Engineers," Third Edition, published by Federal Telephone and Radio Corporation, 1949, as follows:

$$Z_0=\frac{138}{\sqrt{k}}\log_{10}\left[\frac{4w\tanh\frac{h}{w}}{\pi d}\right] \quad (1)$$

where $Z_0$=characteristic impedance in ohms;
$k$=dielectric constant of the interior of the trough;
$w$=the width of the trough;
$h$=the height of the cylindrical conductor above the bottom of the trough; and
$d$=the diameter of the center conductor.

It has been determined empirically that Equation 1 will yield the characteristic impedance of the printed transmission line in accordance with this invention if a slight modification, verified by actual measurements on models of this line, is made. This modification consists in letting $h$ represent the thickness of the dielectric board, $d$ represent the width of the line conductor, and $w$ represent the on-center spacing of the shield strips as indicated in FIG. 3. Further, since the line conductor of the printed transmission line is flat rather than cylindrical, Equation 1 is modified by substituting for $h$, the expression $$h+\frac{d}{2}$$

and for $d$, the expression $d/2$.

Equation 1 then becomes $$Z_0=\frac{138}{\sqrt{k}}\log_{10}\left[\frac{4w\tanh\left(h+\frac{d}{2}\right)}{\pi\frac{d}{2}}\right] \quad (2)$$

where $Z_0$=the characteristic impedance in ohms;
$k$=the dielectric constant of the printed wiring board material;
$w$=the on-center distance betwen shield strips;
$h$=the thickness of the wiring board; and
$d$=the width of the line conductor.

It has been found that Equation 2 yields a correspondence of about five percent with measured values of characteristic impedance with sample lines having the following ranges of dimensions:

$w$=0.125 to 0.250 inch;
$h$=0.060 to 0.125 inch;
$d$=0.010 to 0.020 inch.

Wiring boards composed of "Teflon" glass and epoxy glass have been tested with satisfactory results. The width of the ground conductor for a single coaxial transmission line was 0.50 inch. It has further been found that the spacing between points interconnecting the shielding and ground conductors should be of the order of a quarter wavelength or less at the highest signal frequency to be transmitted on the printed coaxial line.

While the present invention has been described with relation to particular embodiments, it will become obvious to one skilled in the art that the invention with appropriate modification is readily adaptable to various printed wiring techniques without departing from the spirit and scope of the invention.

What is claimed is:

A plurality of independently shielded coaxial transmission lines of the printed circuit type comprising a dielectric board having parallel planar surfaces, a plurality of rectangular line conductors affixed in spaced parallel relation to one wide surface of said dielectric board, a plurality of further rectangular conductors affixed to said one wide surface of said dielectric board on opposite narrow sides of said line conductors in such manner that each further conductor has a narrow side spaced from but in parallel relation to one of the two narrow sides of each of said line conductors, said further conductors providing electric shields for said line conductors to prevent spurious electric coupling therebetween, a wide rectangular ground conductor affixed to a wide dielectric board surface opposite to said one wide surface thereof, said ground conductor having a width substantially equal to the combined widths of said line and further conductors including the spacing therebetween, said ground conductor having narrow edges lying in the same plane with the outer narrow sides of the two outermost of said further conductors, and means extending through said dielectric board for electrically connecting said ground and further conductors at corresponding spaced points along the longitudinal axes thereof, each of said line conductors together with said further conductors on the opposite narrow sides thereof and with said ground conductor constituting one printed coaxial transmission line.

References Cited in the file of this patent

UNITED STATES PATENTS

| | | |
|---|---|---|
| 2,721,312 | Grieg | Oct. 18, 1955 |
| 2,760,169 | Engelmann | Aug. 21, 1956 |
| 2,797,390 | Kostriza | June 25, 1957 |
| 2,812,501 | Sommers | Nov. 5, 1957 |
| 2,867,782 | Arditi | Jan. 6, 1959 |